United States Patent [19]
Hiersig et al.

[11] 3,820,338
[45] June 28, 1974

[54] DRIVE SYSTEM FOR SHIPS WITH MAIN AND AUXILIARY ENGINES FOR ADDITIONALLY DRIVING AN ELECTRIC GENERATOR

[75] Inventors: Heinz M. Hiersig, Dusseldorf-Oberkassel, Germany; George T. R. Campbell, Tokyo, Japan

[73] Assignee: Mannesmann-Meer Aktiengesellschaft, Monchengladbach, Germany

[22] Filed: Feb. 20, 1973

[21] Appl. No.: 333,628

[30] Foreign Application Priority Data
Feb. 18, 1972  Germany............................ 2208511

[52] U.S. Cl..................................... 60/717, 60/718
[51] Int. Cl........................................... F01b 21/00
[58] Field of Search ............. 60/698, 716, 717, 718, 60/39.18 R

[56] References Cited
UNITED STATES PATENTS
| | | | |
|---|---|---|---|
| 2,306,953 | 12/1942 | Jung | 60/11 X |
| 3,601,980 | 8/1971 | Faber | 60/11 |
| 3,683,719 | 8/1972 | Gros | 60/11 |

Primary Examiner—Edgar W. Geoghegan
Assistant Examiner—Allen M. Ostrager
Attorney, Agent, or Firm—Ralf H. Siegemund

[57] ABSTRACT

A power plant for ships with main and auxiliary engines, a main gear box, a superimposing gear and a generator. The auxiliary engine can drive the ship and/or the generator in case of main engine failure or stopping for other reasons. The superimposing gear keeps the generator speed constant when driven from the main engine. The superimposing gear has its two input shafts governed by clutches, and additional couplings determine the path of torque transmission from the auxiliary engine.

9 Claims, 2 Drawing Figures

DRIVE SYSTEM FOR SHIPS WITH MAIN AND AUXILIARY ENGINES FOR ADDITIONALLY DRIVING AN ELECTRIC GENERATOR

BACKGROUND OF THE INVENTION

The present invention relates to a drive and power plant and power transmission system for ships including a main engine, main transmission gear and couplings for driving the propeller shaft of the ship.

Power plants for ships often include additional facilities to drive the electrical power plant, such as a generator selectively from the main engine or from an auxiliary engine. The electric power supply of ships is increasingly furnished by three phase current generators, which means that the generator must be driven at constant speed for maintaining the frequency constant. The generator is normally driven by a Diesel engine as auxiliary power plant. In order to reduce maintenance of this auxiliary Diesel engine, motive power for the generator should be derived from the main engine during normal cruising.

Driving an a-c generator from the main engine while the engine drives the propeller poses the problem that the propeller is not necessarily driven at a constant speed, but constant driving speed is mandatory for the electric generator as stated. Therefore, one uses here constant speed transmissions for maintaining the generator speed independent from speed variations as imparted upon the propellers.

SUMMARY DESCRIPTION OF THE INVENTION

It is an object of the present invention to provide a power plant for ships wherein the electric generator can be driven by the main engine at constant speed. However, whenever necessary (e.g., because the main engine does not run) the generator should be driven from an auxiliary engine. Moreover, the auxiliary engine should also be able to drive the propeller, for example, upon failure of the main engine, so that the latter engine can be repaired or the vessel may still reach the nearest harbor. The drive, power plant and transmission system should be constructed relatively simple and should permit automatic change from any one mode of operation to any other mode.

It is another object of the invention to provide for a new and improved interrelationship between a main engine, an auxiliary engine, a generator and interconnecting gearing for these elements in a ship's drive systems.

In accordance with the preferred embodiment of the invention, such a system is to have a main transmission gear for coupling the main engine to the drive shaft, and that gear box is to have an auxiliary shaft for torque transfer in either direction. A superimposing transmission gear structure is provided with three shafts, one of which having the generator coupled thereto, a second one is connectable to the auxiliary gear box shaft by means of a clutch, the third shaft is connectable to the auxiliary engine, also via a clutch. Auxiliary motion means provide a controlled rotary output to be superimposed upon the rotation of the second shaft when driven by the auxiliary shaft, for driving the generator at a constant speed. Additionally, the third shaft can be drivingly connected to the second shaft so that the auxiliary engine drives the propeller under reversal of torque transmission of the auxiliary gear box shaft. Still additionally, the third shaft can be drivingly connected to the generator shaft. The several selective connections can be effected by means of controllable clutches, whereby for example shift clutches govern the three shafts mentioned, and the said additional driving connections are effected by controlled clutch couplings as between a shaft and a gear in each instance.

The superimposing transmission gear as a whole is a controllable, plural transmission path device wherein the primary input (from the auxiliary gear box shaft) can also be the output in case the auxiliary engine is to take over driving the ship. Separation of principle gear box and superimposing gear permits each of them to be optimized in design. The main gear box is designed in accordance with the requirement for having the propeller driven by the main engine. The main gear has merely a particular, externally accessible, auxiliary shaft. The superimposing gear can be designed independently from the requirements of the main gear box as to size and power transmission characteristics. Rather, the superimposing gear is designed in accordance with the power rating of the auxiliary engine, as well as the power requirements of the generator. As there is no particular rule as to the auxiliary shaft, as far as extending from the main gear box, its gear ratio therein can readily be selected to match the input/output requirements of the superimposing gear when connected to the auxiliary shaft of the main gear.

In the preferred form of practicing the invention, it is suggested to include a planetary gear in the superimposing gear, of which the ring or spur gear is driven from the said auxiliary shaft, the planet wheel carrier is driven by the auxiliary motion means and the sun wheel is geared to the generator. The auxiliary motion means is preferably a hydro-engine of the swash plate type fed by a hydrostatic pump, which is also driven by the sun wheel. The hydro-engine is controlled by a speed governor, so that the sun wheel rotation remains constant.

Normally, the main engine drives the propeller via the gear box and the auxiliary shaft drives the generator via the superimposing gear, whereby the auxiliary motion means introduces compensating rotation to offset speed variations of the main engine. In emergency cases, with complete drop-out of the main engine, the auxiliary engine is connected via clutches to the auxiliary shaft. In case the auxiliary engine does not have to drive the ship, a different transmission path is set up via another clutch or coupling between auxiliary engine and generator. Whenever the auxiliary engine is to be used, the clutch connecting the engine to the superimposing gear structure is engaged, and additional clutches therein determine whether motive power be transmitted to the auxiliary shaft or to the generator. These additional clutches, as stated, are controlled couplings which effect connections by coupling a gear or pinion to the shaft on which it is loosely seated. This gear or pinion in each instance then meshes with gear train means that lead to the auxiliary shaft in one case and to the generator shaft in the other case.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompnaying drawings in which:

Proceeding now to the detailed description of the drawings, FIG. 1 shows a main engine 1 for driving a ship. The engine is connected to a main transmission gear box 3 via a first clutch 2 so as to drive a propeller shaft 4 which is connected to one driven output of the gear 3. The transmission gear 3 has an auxiliary shaft 5, which is geared to the gear box 3 so that torque transmission is possible in either direction; in other words, auxiliary shaft 5 can be an input or an output of rotation.

Figure 1:
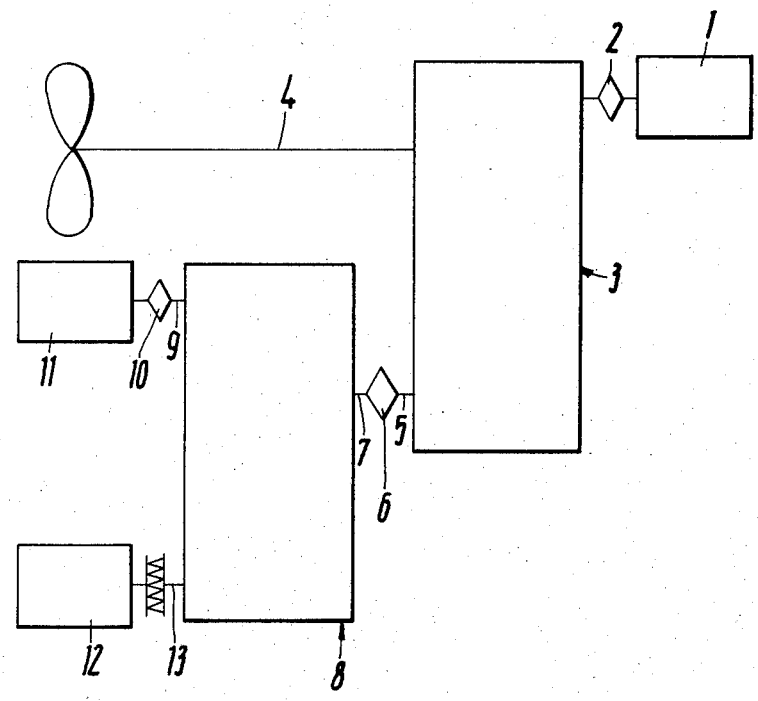
FIG. 1 is a schematic layout of the drive and power plant with transmission system of a ship in accordance with the invention.

Shaft 5 is connectable to a first shaft 7 of a superimposing gear 8 via a second clutch 6. Gear structure 8 has a second shaft 9, which is always a driving input shaft and which is connectable to an auxiliary Diesel engine 11 via a third clutch 10. The driven output 13 of gear 8 is connected to the shaft of an electrical, three-phase generator 12.

Figure 2:
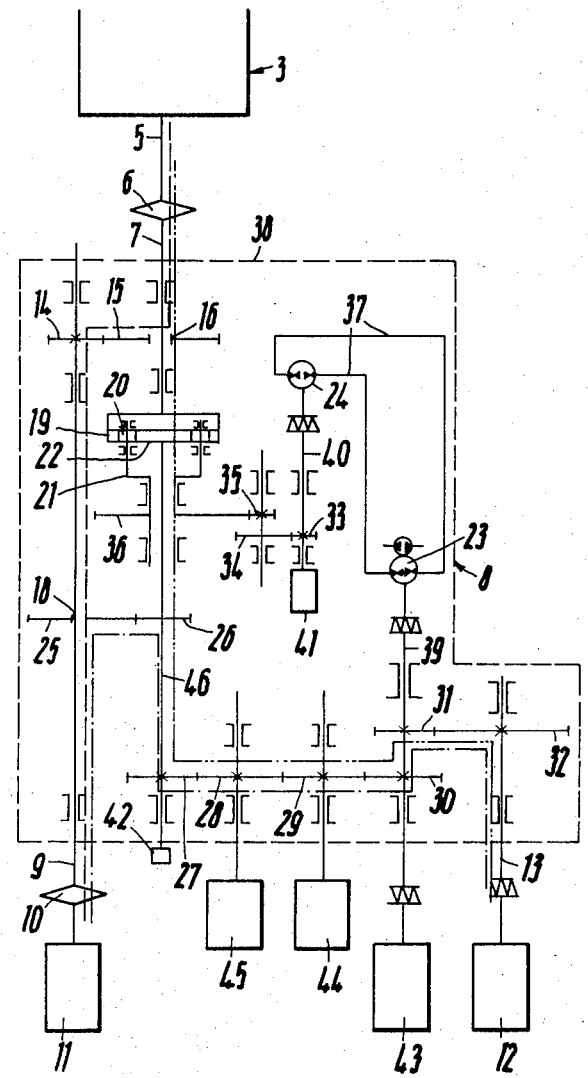
FIG. 2 shows details of the superimposing gear and transmission means of the system shown in FIG. 1.

After having described the general layout, we turn now to FIG. 2 showing details of transmission gear structure 8, including the specific features of the invention. Gear 8 is encased in a housing 38. The normal input of gear 8 is derived from the main gear 3, as stated above, via auxiliary shaft 5, clutch 6 when engaged and shaft 7, the latter pertaining to gear 8. Shaft 7 is connected to and drives directly the ring or spur gear 19 of a planetary gearing having a sun wheel 22 on a shaft 46, which carries another gear 27. A gear train comprising gears 27, 28, 29, 30, 31 and 32, connects that sun wheel to the shaft 13 for driving generator 12.

In addition, gears 30 and 31 on a common shaft 39, provide motive power to a hydrostatic pump 23. Pump 23 is connected to a hydro-engine 24 of the swash plate type via conduits 37 to provide hydrostatic power thereto. Hydro-engine 24 is controlled as to direction of rotation and speed by means of a speed governor 42 on shaft 46. The object here is to ensure constant speed of shaft 46 (ultimately of the generator as geared to that shaft). Therefore, governor 42 monitors speed deviations from constant speed of shaft 46 and controls the hydro-engine 24 accordingly.

A gear 33 is mounted on the output shaft 40 of the hydro-engine, which gear meshes a gear 34 which in turn drives a gear 35 on a common shaft, and gear 35 in turn meshes a gear 36 on shaft 46 to drive the carrier 21 for the planetary wheels 20 of the said planetary gear. This way, motion as derived from the hydro-engine is superimposed upon the motion on input shaft 7 and, of course, the rotation of the sun wheel and of shaft 46 represents the combining and superpositioning of the two rotations.

A spring-biased, hydraulically vented brake 41 is provided at the end on shaft 40 in order to determine the zero position of the hydro-engine, i.e., in order to determine the operating point in which engine 24 does not rotate. Brake 41 is necessary in order to provide supporting torque, e.g., during starting when the hydraulic system has not yet developed sufficiently high pressure. If the supporting torque were not provided for, the drive stops, and the hydro-engine will be overrun and destroyed.

It can thus be seen, that the rotary output of the hydro-engine 24 is superimposed upon the rotary input at shaft 7 using the planetary gearing to combine the rotations. Upon suitable control, the shaft 13 turns with constant speed, as any speed deviation on shaft 7 is offset by introducing a compensation component as derived from the hydro-engine. This engine can run in either direction so that rotation can be added or subtracted from the rotation as provided by shaft 7.

Gear 8 includes another transmission gear train, extending from shaft 7 to a gear 15 and being connectable to that shaft by means of a clutch coupling 16. Gear wheel 15 meshes a pinion 14 on shaft 9, and the said third clutch 10 connects shaft 9 to auxiliary engine 11. Another drive train runs from engine 11 via clutch 10, shaft 9 to another clutch coupling 18, for coupling a normally loosely seated gear 25 to shaft 9. Gear 25 meshes a gear 26 on shaft 46 which, of course, leads via gears 27, 28, 29, 30, 31 and 32, to shaft 13 for driving generator 12.

The several clutches 2, 6, 10, 16, 18, are individually controllable, manually or under program control. Of course, not all clutches are engaged all of the time, but selection permits completion of particular driving trains in any instant, while isolating rotary inputs from each other when necessary. The system, particularly as controlled by and through gear 8, operates as follows.

At first, regular cruising is to be considered, also called the cruising mode. Main engine 1 runs and clutch 2 is engaged so that the engine drives the gear box 3, which in turn drives propeller 7. Clutch 6 is likewise engaged so that auxiliary shaft 5 drives primary input shaft 7 of the super-imposing gear 8. Engine 11 is entirely off or on stand-by, but clutch 10 is disengaged.

Shaft 7 turns ring or spur gear 20 of the planetary gear, and the planetary wheel carrier 21 is driven by the hydro-engine 24 via shaft 40, etc. Ring gear 20 and carrier 21 together impart a combined rotation upon sun gear 22, whose output shaft 46 is coupled to generator shaft 13 via several gears and drives same. The dashdouble-dot line indicates the principle route of torque transmission as passing through gear 8. The superpositioning of rotation provides for constant speed of the generator in spite of speed deviations of the main engine by 10 to 15 percent during cruising. Clutch coupling 18 is off, interrupting isolating shaft 49 from shaft 46. Strictly speaking, coupling 16 does not have to be engaged, but for reasons to be explained shortly, shaft 9 could run idly during normal operation as stand-by provision.

In case the main engine speed drops below the range that can be compensated by the hydro-engine, clutches 10 and 18 engage and clutch 16 disengages. Accordingly, Diesel engine 11 is turned over and starts. After about 5 to 20 seconds, engine 11 is able to furnish full driving power for the generator, and clutch 6 disengages. The transmission path for motive power now available for driving the generator 12, is indicated by a dash-dot line. The driving train operating along that path includes the elements 9, 18, 25, 26, 46, 27, 28, 29, 30, 31, 32 and shaft 13.

Some time later, main engine 1 again comes up to full speed, and the auxiliary driving train may be interrupted by disengaging clutches 18 and 10 and re-engaging clutches 6 and 16.

If for some reason main engine 1 drops out entirely, clutches 2 and 18 disengage, while clutch 16 engages (unless already engaged). Gears 14 and 15 are designed to match the propeller speed to the power output available from small engine 11 in accordance with the speed/torque characteristics of the propeller, and as reflected as input on gear box 3 via auxiliary shaft 5. Shortly thereafter, clutch 10 engages so that auxiliary engine 11 drives the propeller in that the shaft 5 of gear box 3 is now an input shaft. The transmission of motive power runs according to the dashed line. Electric power may not be derived from generator 12 in this case, as all available power from engine 11 should be used to drive the vessel. Electric current must, therefore, be taken from an emergency stand-by unit. However, there is no principle reason that engine 11 does not also drive the generator with coupling 18 remaining engaged.

When main engine 1 does not run for normal reasons, i.e., the ship is in a harbor, generator 12 is driven directly by the auxiliary engine 11. Clutches 10 and 18 are engaged so as to connect the second input shaft 9 to shaft 13 via gears 25 through 32. A superimposing gear is not needed in this case, because engine 11 drives only the generator in this case, and can be speed controlled exclusively as desired for constant generator speed.

The invention is not limited to the embodiments described above but all changes and modifications thereof not constituting departures from the spirit and scope of the invention are intended to be included.

We claim:

1. Drive and power plant for ships, comprising:
   a main engine;
   a transmission gear box with input shaft and auxiliary shaft, the gear box being drivingly connected to the propeller of the ship;
   a first clutch connecting the main engine to the input shaft;
   an auxiliary engine;
   a superimposing gear having first, second and third externally accessible shaft;
   a generator connected to the first shaft;
   a second clutch connecting the auxiliary shaft to said second shaft;
   a third clutch connecting the auxiliary engine to the third shaft;
   auxiliary motion means providing compensating rotation and being coupled to the superimposing gear, the superimposing gear combining the rotary motion of the auxiliary motion means with the rotation of the second shaft when driven by the main engine via said auxiliary shaft, to drive the first shaft and the generator at constant speed; and
   first clutch and transmission means for drivingly connecting the third shaft to the second shaft, so that the auxiliary engine drives said auxiliary shaft via said second clutch, for driving the propeller when the main engine is at rest.

2. Drive and power plant as in claim 1, including second clutch and transmission means connecting said third shaft to said first shaft so that the auxiliary engine drives the generator when motive power is not applied to the second shaft by the gear box.

3. Drive and power plant as in claim 2, the second clutch and transmission means including a first gear, a clutch connecting the gear to the third shaft, a second gear meshing the first gear and being drivingly connected to the first shaft.

4. Drive and power plant as in claim 1, wherein the superimposing gear includes a planetary gear with sun wheel, planetary gears, carrier and ring gears, the ring gear being drivingly connected to said first shaft, the sun wheel connected to the first shaft via a driving train, the said auxiliary motion means driving said carrier.

5. Drive and power plant as in claim 4, the said auxiliary motion means including a hydrostatic pump driven through said driving train;
   a hydro-engine fed by said pump; and a speed governor controlling the hydro-engine to obtain said compensating rotation.

6. Drive and power plant as in claim 1, said first clutch and transmission means including a pinion on the third shaft;
   a gear meshing the pinion; and
   a clutch for coupling the latter gear to the second shaft.

7. Drive and power plant as in claim 1, wherein the said auxiliary motion means including a hydromotor;
   a hydrostatic pump feeding the hydro-engine; and a speed governor controlling the pump in accordance with compensating rotation needed to obtain constant generator speed.

8. Drive and power plant for ships having a main engine, a gear box connecting the main engine to the propeller and having an auxiliary shaft, the plant further having an auxiliary engine and an electric generator, the improvement of a motion superimposing gear means comprising:
   a first driving train connecting the auxiliary shaft to the generator for driving the generator;
   means for superimposing additional motion upon the driving train to obtain constant speed of the generator;
   a bypass drive train connecting the auxiliary engine to the auxiliary shaft to drive the auxiliary shaft, the gear box and the propeller when the main engine is not operating, the first driving train including means to disconnect the auxiliary shaft from the generator; and
   additional transmission means including part of the first driving train for connecting the auxiliary engine to the generator.

9. In a power plant for ships having a main engine, a gear box coupled to the main engine, a propeller shaft coupled to the gear box for being driven by the main engine, an auxiliary engine and a generator, the gear box having an auxiliary shaft for transmission of torque in either direction, the improvement comprising:
   a planetary gear having a ring gear with input shaft, a sun wheel and a planetary gear carrier with planetary gears meshing the sun wheel and the ring gear;
   first clutch means connecting the ring gear to the auxiliary shaft;
   auxiliary motion means connected to the carrier to provide motion thereto so that the sun wheel rotates at constant speed;
   a gear train coupling the sun wheel to the generator;
   a shaft connected to the auxiliary engine;
   first clutch and gear means coupling the shaft to the gear train; and
   second clutch and gear means coupling the shaft to the input shaft.

* * * * *